United States Patent [19]

McGill et al.

[11] Patent Number: 5,017,921
[45] Date of Patent: May 21, 1991

[54] RADAR SYSTEM AND A METHOD FOR OPERATING A RADAR SYSTEM

[75] Inventors: John McGill, Smithtown; Stanley F. Zoubek, Jr., Bohemia, both of N.Y.

[73] Assignee: Grumman Aerospace Corporation, Bethpage, N.Y.

[21] Appl. No.: 450,216

[22] Filed: Dec. 13, 1989

[51] Int. Cl.⁵ .......................... H04K 3/00; G01S 7/36
[52] U.S. Cl. ....................................... 342/18; 342/98; 342/159
[58] Field of Search ....................... 342/18, 16, 17, 13, 342/82, 83, 98, 159, 199

[56] References Cited

U.S. PATENT DOCUMENTS

| | | | |
|---|---|---|---|
| 3,281,837 | 10/1966 | Van Hijfte | 342/16 |
| 3,569,965 | 3/1971 | Bagley | 342/98 |
| 3,727,223 | 4/1973 | O'Meara | 342/82 X |
| 3,755,813 | 8/1973 | Evans et al. | 342/82 |
| 4,135,189 | 1/1979 | Josse | 342/18 |
| 4,206,461 | 6/1980 | Pease et al. | 342/159 |
| 4,328,497 | 5/1982 | Vale | 342/18 |
| 4,358,766 | 11/1982 | Mehron | 342/18 |
| 4,527,161 | 7/1985 | Wehner | 342/152 |
| 4,546,354 | 10/1985 | Boles | 342/179 |
| 4,549,184 | 10/1985 | Boles et al. | 342/25 |
| 4,719,649 | 1/1988 | Woodsum et al. | 342/14 X |

*Primary Examiner*—John B. Sotomayor
*Attorney, Agent, or Firm*—Scully, Scott, Murphy & Presser

[57] ABSTRACT

A radar system and a method of operating a radar system. The radar system comprises a transmitter-receiver subsystem to transmit a series of electromagnetic pulses, to scan those pulses across an area of interest, and to receive echoes of the pulses. The radar pulses may be transmitted at a multitude of frequencies, each of which is in one of a multitude of channels. The radar system further includes a channel selection subsystem, first, to measure or sample the electromagnetic interference received by the transmitter-receiver subsystem in each of the channels of the radar system during each of at least selected scans of the radar pulses across the area of interest, and second, on the basis of those interferences measurements, to select automatically a channel of the radar system to transmit the radar pulses and to generate a signal identifying that channel. The transmitter-receiver subsystem includes a channel selector for receiving this signal from the channel selection subsystem, and in response to that signal, for selecting a frequency in the selected channel to transmit the radar pulses the next time those pulses are scanned across the area of interest.

20 Claims, 5 Drawing Sheets

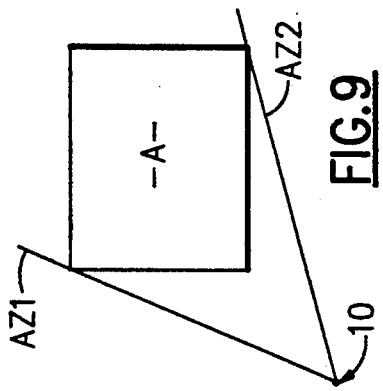
FIG.9
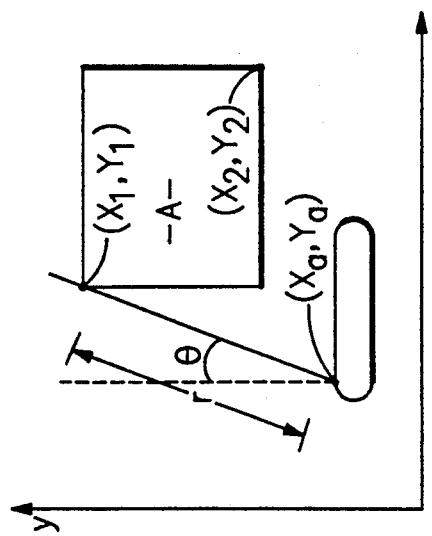
FIG.13
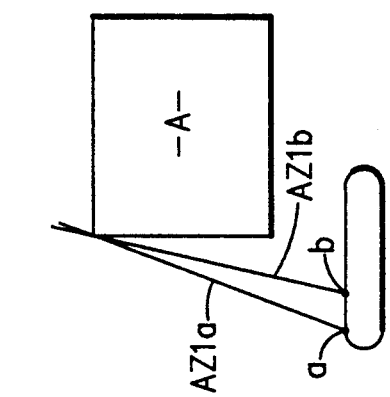
FIG.12
| PULSE NO | CHANNELS SAMPLED AFTER THE PULSE |
|---|---|
| 1 | 00 → 33, (C−7) → (C+2) |
| 2 | 34 → 66, (C+3) → (C+7), (C−7) → (C−3) |
| 3 | 67 → 99, (C−2) → (C+7) |
ONE COMPLETE SET OF MEASUREMENTS
FIG.6
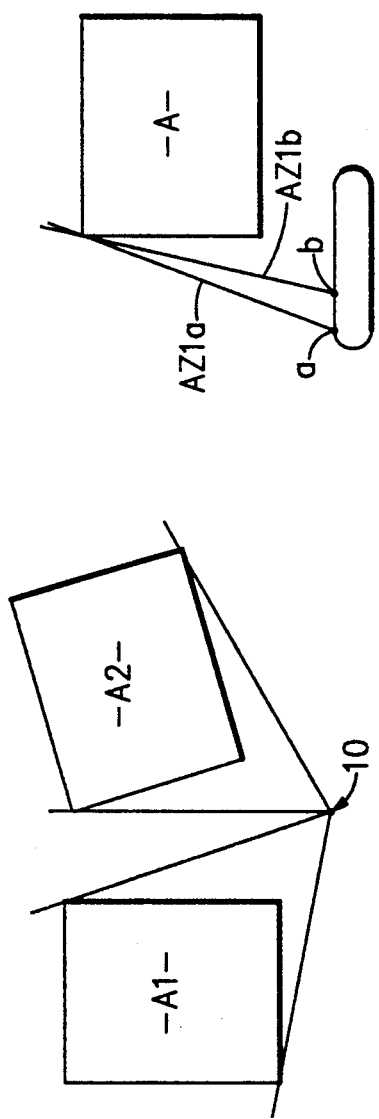
FIG.10

5,017,921

RADAR SYSTEM AND A METHOD FOR OPERATING A RADAR SYSTEM

BACKGROUND OF THE INVENTION

This invention generally relates to multichannel, pulsed radar systems; and more specifically, to a multichannel, pulsed radar system having a subsystem to select the channel over which to transmit the radar pulses, and to a method of operating such a radar system.

In a pulsed radar system, electromagnetic pulses, usually ultra-high frequency radio waves, are transmitted and then reflected by objects that they encounter. The reflected pulses are received by the radar system, and information about the distance and azimuths of the objects producing the reflections can be derived from the delay between the time a particular pulse is transmitted and the time its reflection is received, as well as the direction of arrival of the reflected pulses.

The ability to receive information from the reflected radar pulses is affected by electromagnetic interference received by the radar system; and this interference, often referred to as jamming, generally includes all electromagnetic signals or energy received by the radar system other than the reflected radar pulses. Such interference may be caused by other electronic equipment or data transmission systems in the vicinity of the radar system, and, especially in the case of radar systems used for military purposes, electronic jamming may be intentionally created for the purpose of interfering with the radar system.

To minimize the effects of jamming, radar systems are often designed so that they may transmit and receive the radar pulses over a multitude of channels. With such a system, if significant interference is being received over one or a group of channels, another channel can be selected to transmit the radar pulses.

The channel over which the radar pulse is to be transmitted can be selected in a variety of ways. In a relatively simple case, the channel having the least amount of measured or estimated interference can be chosen to transmit the radar pulse. As a refinement of this relatively simple case, the interference being received over each channel can be measured or estimated, these raw values can be converted to qualified values that indicate the extent to which the interference affects the ability of the radar system to detect targets over each of the channels of the radar system, and the channel having the best potential to detect targets can be selected to transmit the radar pulses.

With both of the above-outlined general procedures, it is preferred to take a multitude of samples or measurements of the interference being received over each channel of the radar system each time the radar pulse is scanned across an area being monitored. Radar systems are currently available with up to a hundred or more channels; and with a radar system having such a large number of channels, it is difficult, first, to take a multitude of samples or measurements of the interference being received over each of the channels, and second, to process all of the acquired data properly and promptly to select the preferred channel to transmit the radar pulses.

SUMMARY OF THE INVENTION

An object of the present invention is to provide a multichannel, pulsed radar system with a subsystem to measure or sample automatically the interference being received over each channel of the radar system and, on the basis of these interference measurements, to select automatically a channel to transmit the radar pulses.

Another object of the present invention is to use a multichannel, pulsed radar system to repeatedly scan an area of interest, to measure the electromagnetic interference received by each channel of the system during each such scan, and to select the channel receiving the least measured electromagnetic interference to transmit the radar pulses the next time the area is scanned.

A further object of this invention is to use a multichannel, pulsed radar system to scan repeatedly an area of interest, to determine a target detection potential value for each channel of the radar system at each of a multitude of directions over the area of interest, and to select the channel having the largest composite target detection potential value to transmit the radar pulses the next time the area is scanned.

These and other objectives are attained with a radar system comprising a transmitter-receiver subsystem and a frequency selection subsystem. The transmitter-receiver subsystem is provided to transmit a series of electromagnetic radar pulses, to scan the radar pulses across an area of interest a multitude of times, and to receive echoes of those pulses. The radar pulses may be transmitted at a multitude of frequencies, each of which is in one of a multitude of channels; and during this operation of the radar system, the transmitter-receiver subsystem receives electromagnetic interference at a multitude of frequencies as well as echoes of the transmitted pulses. The frequency selection subsystem is provided, first, to measure or sample the electromagnetic interference received by the transmitter-receiver subsystem in each of the channels of the radar system during at least selected scans of the area of interest by the radar pulses, and second, on the basis of those interference measurements, to select automatically a channel of the radar system to transmit the radar pulse and to generate a channel selector signal identifying that selected channel. The transmitter-receiver subsystem includes a channel selector for receiving the channel selector signal from the frequency selection subsystem and, in response to that signal, for selecting a frequency in the selected channel to transmit the radar pulses the next time the radar pulses are scanned across the area of interest.

The electromagnetic interference received by the radar system is comprised of a multitude of component signals, with the magnitude of each of the component signals being proportional to the amount of electromagnetic interference received by the transmitter-receiver subsystem at the frequency of the component signal. Preferably, the frequency selection subsystem includes filter means, an analog-to-digital converter and control means. The filter means is connected to the transmitter-receiver subsystem to receive the output signal thereof and to generate a filtered output signal proportional to the amplitude of the electromagnetic interference received by the transmitter-receiver subsystem in a given one of the channels of the radar system. The analog-to-digital converter is connected to the filter means to receive the filtered output signal therefrom and to generate a digital signal representing the amplitude of the electromagnetic interference received by the transmitter-receiver subsystem in the given channel. The control means is connected to the filter means to select the given channel, and is connected to the analog-to-digital converter to receive the digital signal therefrom.

Preferably this control means selects each of the channels of the radar system as that given channel a multitude of times during each of the selected scans of the area of interest by the radar pulses so that during each such scan, the amount of the electromagnetic interference received by each channel of the radar system is measured a multitude of times. With this preferred embodiment, the analog-to-digital converter generates a digital value for each electromagnetic interference measurement of each channel, and all of these generated digital values are conducted to a processor.

The processor is provided to process the data transmitted to it to select the channel over which to transmit the radar pulses the next time those pulses are scanned across the area of interest, and a variety of different specific procedures may be used to select this channel. With a first procedure, the channel receiving the least amount of total measured or estimated interferences is chosen to transmit the radar pulses.

To implement this procedure, the processor may be provided with summation means and a comparator. The summation means adds the digital values generated during a given scan of the area of interest for each channel of the radar system to derive an electromagnetic interference summation value for each of those channels, and the comparator then compares all of the derived interference summation values and determines the minimum of these values. The channel having that minimum summation value may be chosen to transmit the radar pulses the next time those pulses are scanned across the area of interest. Preferably, the processor also records the maximum digital value generated for each channel during the given scan of the area of interest; and after that scan, the maximum digital value generated for each channel is subtracted from the electromagnetic interference summation value for the channel to derive an adjusted summation value for each of the channels. The processor determines the channel having the minimum adjusted summation value, and the channel having this minimum value is chosen to transmit the radar pulses the next time those pulses are scanned across the area of interest.

With an alternate procedure, the selection of the channel to transmit the radar pulses is made on the basis of values, referred to as detection potential values, that represent, or indicate, the range at which the radar system may detect a given target over a given channel in the direction of arrival of a measured interference signal. To implement this procedure, the processor is preferably provided with conversion means, summation means and a comparator.

The conversion means receives the digital values from the analog-to-digital converter and that represent the electromagnetic interference measurements, and converts these digital values to detection potential values. The summation means adds all of the detection potential values generated during a given scan of the area of interest for each channel of the radar system to derive a composite detection potential value for each channel. The comparator then compares all of these composite detection potential values and determines the maximum of these values, and the channel having that maximum composite detection potential value is selected to transmit the radar pulses the next time those pulses are scanned across the area of interest.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 6 shows one sequence for measuring the channels of the radar system for electromagnetic interferences.

FIG. 9 generally shows the relationship between the radar system and an area that may be monitored by that system.

FIG. 10 is similar to FIG. 9 but shows two separate areas that may be monitored by the radar system.

FIG. 12 is similar to FIG. 9 but also shows a path over which the radar system itself may be carried.

FIG. 13 is similar to FIG. 12 and shows the area of interest and the path of the radar system on an X-Y coordinate system.

DETAILED DESCRIPTION OF THE PREFERRED EMBODIMENTS

Figure 1:
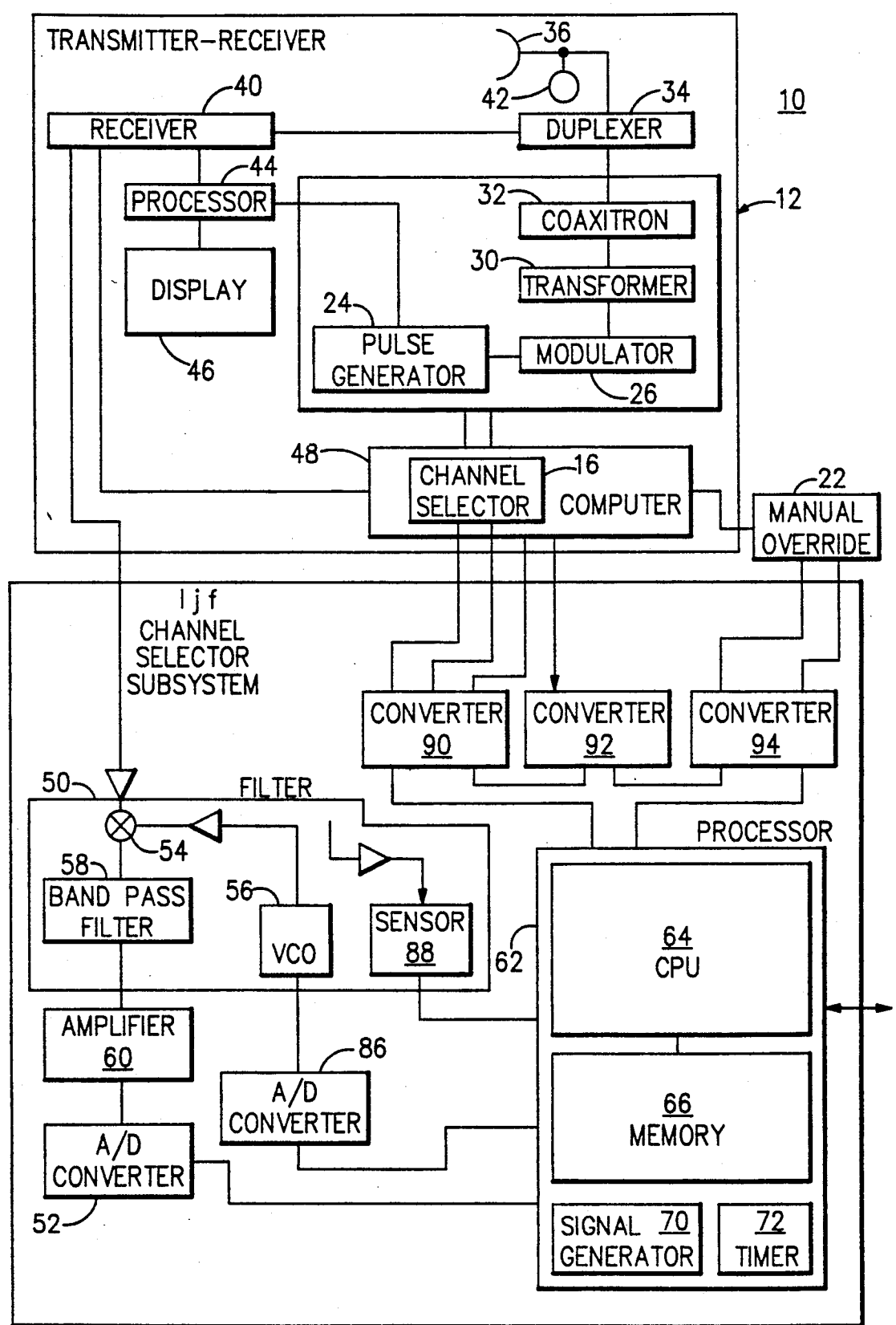
FIG. 1 is a simplified block diagram illustrating a radar system according to the present invention.

FIG. 1 illustrates radar system 10, generally comprising transmitter-receiver subsystem 12 and frequency selection subsystem 14. Transmitter-receiver subsystem 12 is provided to generate and to transmit a series of electromagnetic pulses, to scan those pulses across an area of interest a multitude of times, and to receive echoes of the pulses. System 10 is a multichannel system—that is, it is of the type where the radar pulses may have a multitude of frequencies, each of which is within a respective one frequency range or channel. As is conventional, the channels of system 10 can be numbered in a consecutive order, with the channel numbers increasing with the frequencies of the channels. For instance, system 10 may be constructed to transmit the radar pulses over one hundred separate channels, each of which has a frequency band of about 1MHz, within an overall frequency range of 400–500 MHz. These channels may be numbered from 00 to 99; with channel 00 having a bandwidth from 400 to 401 MHz, channel 01 having a bandwidth from 401 to 402 MHz and channel 02 having a bandwidth from 402 to 403 MHz.

Frequency selection subsystem 14, which may be referred to as a least jammed frequency selection subsystem, is provided, first, to measure or sample the electromagnetic interference received by the transmitter-receiver subsystem 12 in each of the channels of the radar system during each of at least selected scans of the radar pulses across the area of interest, and second, on the basis of those interference measurements, to select automatically a channel of the radar system to transmit the radar pulse and to generate a channel selector signal identifying that selected channel. Transmitter-receiver subsystem 12 includes channel selector means 16 for receiving the channel selector signal from the frequency selection subsystem 14, and in response to this signal, for selecting a frequency in the selected channel to transmit the radar pulses the next time the radar pulses are scanned across the area of interest. Preferably, radar system 10 also includes a manual override control 22, first, to block selectively the channel selector signal generated by frequency selection subsystem 14, and second, to generate a substitute channel selector signal identifying a channel selected by an operator. When generated, this substitute channel selector signal is conducted to channel selector means 16 to transmit the radar pulses over a channel chosen by an operator, independent of the channel selector signal generated by the frequency selection subsystem.

More specifically, the transmission of a radar pulse is initiated by pulse generator 24, which couples the radar trigger pulse to modulator 26. The modulator generates the wave form to be transmitted and couples it through transformer 30 to coaxitron 32 where it is preferably converted to pulsed microwave power. A duplexer 34 operates by coupling the microwave power from the coaxitron to an antenna 36 during one portion of the radar pulse period, and then coupling the radar return echoes from the antenna to a receiver 40 during the remainder of the radar pulse period. Typically, a motor 42 is used to rotate the antenna to scan the radar pulse period across an area or field of interest.

When a transmitted pulse strikes an object such as a distant ship, an echo is reflected back to the antenna 36 where it is coupled through the duplexer to the receiver, and the lapsed time from transmission to reception of the echo is proportional to the distance travelled. The reflected input to the receiver from one transmitted pulse can be characterized as a train of echoes or pulses from objects at different distances. Generally, the echoes can be categorized into targets, which are of interest, and clutter, which is not. Antenna 36 may also receive electromagnetic interference directed to it. Receiver 40 amplifies the total electromagnetic radiation signal received by the antenna and transmits the amplified signal to a processor 44 that converts the amplified signal to a preferred signal format, which is coupled to a display terminal 46. Pulse generator 24 also transmits a pulse signal to processor 44 to synchronize that processor with modulator 26 and duplexer 34. A general purpose computer 48 is conventionally provided to analyze the reflected radar pulses and to perform other conventional computing and control functions for the radar system. Indeed, as represented in FIG. 1, the function of channel selector means 16 may be performed, in whole or in part, by general purpose computer 48.

A signal proportional to the electromagnetic radiation received by antenna 36 is also coupled to frequency selection subsystem 14 from transmitter-receiver subsystem 12, and this coupled signal is used to measure the electromagnetic interference received over each channel of the radar system. In particular, the output signal from the transmitter-receiver subsystem comprises a multitude of component signals; and each of these component signals has a unique frequency, and the magnitude of each component signal is proportional to the amplitude of the electromagnetic radiation received by the transmitter-receiver subsystem at the frequency of the component signal. Filter means 50 receives the output signal from the transmitter-receiver subsystem and transmits to analog-to-digital converter 52 a filtered output signal having an amplitude that is a function of the amplitude of the electromagnetic radiation received by the transmitter-receiver subsystem in a selected one of the channels of radar system 10.

More specifically, filter means 50 comprises mixer 54, voltage controlled oscillator 56 and band pass filter 58. The output signal of the transmitter-receiver subsystem and the output signals of oscillator 56 are conducted to mixer 54; and, in a conventional manner, mixer 54 heterodynes the two signals fed to it and produces a third, output signal having a frequency band which is centered in a fixed range. Also, this output signal of mixer 54 is amplitude modulated to the same degree as a chosen frequency band of the signal conducted to the mixer from the transmitter-receiver subsystem, with this chosen frequency band, first, being determined by the frequency of the signal applied to the mixer by voltage controlled oscillator 56, and second, being a selected one of the channels of the radar system 10.

The output of mixer 54 is applied to band pass filter 58, which transmits all of the component frequencies of the signal applied to it that are within a given frequency range. This frequency range is chosen to be approximately the same as the frequency band of the output signal of mixer 54, so that filter 58 passes most, if not all, of the component frequencies of the signal applied to the filter. Filter 58 attenuates to varying degrees the amplitudes of the component frequencies of the signal applied to it; and in particular, the degree of attenuation increases as the frequency of a component signal increases or decreases relative to the center point of the range of frequencies passed through filter 58.

A logarithmic amplifier 60 may be located between filter 58 and converter 52 to amplify the output from the filter means 50 to desired levels prior to that output signal being received by the analog-to-digital converter. The analog-to-digital converter receives the filtered output signal from the filter means 50 and converts that analog signal to a digital signal representing the amount of electromagnetic radiation received by the transmitter-receiver subsystem in the above-mentioned selected channel, and this digital signal is then transmitted to processor 62.

Filter means 50, and in particular oscillator 56, is controlled so that during each scan of the area of interest, each channel of the radar system is chosen as the above-mentioned selected channel at least once. Preferably, filter means 50 is controlled so that each channel of the radar system is chosen as that selected channel a multitude of times during each such scan, and thus so that during each such scan of the area of interest, the amount of electromagnetic radiation received by each channel of the radar system is measured a multitude of times.

Each time this selected channel is changed, filter means 50 passes to the analog-to-digital converter 52 a new analog signal having an amplitude that is a function of the electromagnetic radiation received by the transmitter-receiver subsystem over the new selected channel. The analog-to-digital converter 52 converts each of these analog signals to a digital value and transmits that digital value to the processor 62. Hence, with the preferred arrangement, where the electromagnetic radiation on each of the channels of system 10 is sampled a multitude of times during each scan of the field of interest, analog-to-digital converter 52 generates and transmits to processor 62 a digital value for each electromagnetic radiation measurement of each channel.

The channels of system 10 may be measured or sampled for electromagnetic radiation in any suitable order or sequence; and, for instance, the channels may be sampled in a numeric order according to numbers assigned to the channels. For example, with the preferred radar system 10 having 100 channels numbered consecutively from 00 to 99, one complete set or sequence of electromagnetic radiation measurements may be taken over a period in which the radar system transmits three pulses; and in particular, the electromagnetic radiation may be measured on channels 00–33, 34–66 and 67–99 after, respectively, the first, second and third pulses transmitted during this period. These sets of measurements may be repeated as long as antenna 36 is directed toward or over the area of interest.

Processor 62 is provided to process the data transmitted to it to select the channel over which to transmit the radar pulses the next time those pulses are scanned across the area of interest; and, generally, processor 62 includes central processing unit 64, memory unit 66, and signal generator 70. Processor 62 also includes a timer and interrupt signal generator 72 to keep track of various time periods and to generate interrupt signals to other components of the processor as desired, as discussed in greater detail below. A variety of different specific procedures may be used to select the channel to transmit the radar pulses. Processor 62, specifically central processing unit 64 and memory unit 66 thereof, may function or be configured differently depending on the particular procedure used to choose the channel for the radar pulses, and FIGS. 2 and 3 illustrate two examples of processor configurations that may be used in the practice of the present invention.

Figure 2:
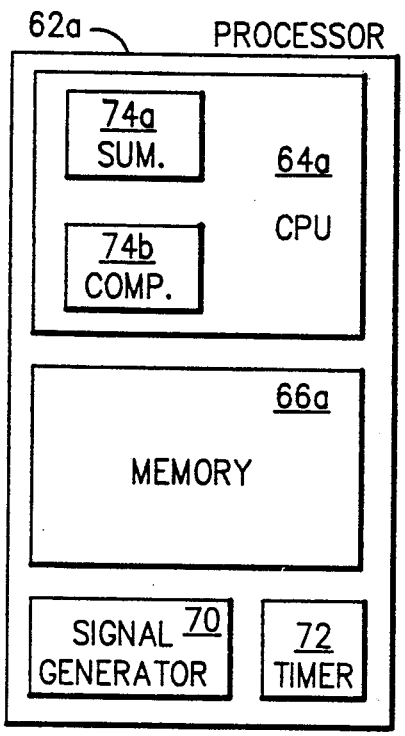
FIG. 2 shows a first embodiment of a processor that may be used in the radar system of FIG. 1.

FIG. 2 shows processor 62a for processing the data transmitted to it in a first, relatively simple manner; and this processor, specifically central processing unit 64a thereof, includes summation means 74a and comparator 74b. Summation means 74a adds the digital electromagnetic radiation values generated during a given scan of the field of interest for each channel of the radar system, to thereby derive an electromagnetic summation value for each of the channels of system 10. These summation values may be used to determine the channel over which to transmit the radar beam the next time the radar beam is scanned across the area of interest. To do this, after the given scan is completed, comparator 74b compares all of the derived summation values, and determines the minimum of these summation values and the channel having that minimum summation value. Then, signal generator 70 generates, and conducts to channel selector 16, a signal identifying this channel having that minimum summation value.

In the process described above, the calculated summation values provide what can be referred to as a first estimate of the relative amounts of interference received by the channels of system 10. These summation values are only an estimate of that interference for several reasons, one of which is that the summation values do not distinguish between electromagnetic interference received by the radar system, and radiation originally transmitted by the radar system itself and reflected back to it by a target or other objects. More specifically, the amplitude of the signal transmitted to frequency selection subsystem 14 from transmitter-receiver subsystem 12 is proportional to the amplitude of the total electromagnetic radiation received by the transmitter-receiver subsystem, and this received radiation includes interference as well as the above-mentioned reflected radiation. Thus, the data transmitted to processor 62a do not distinguish between those two types of received radiation, nor does the processor itself as it calculates the summation values in the above-identified manner.

Figure 3:
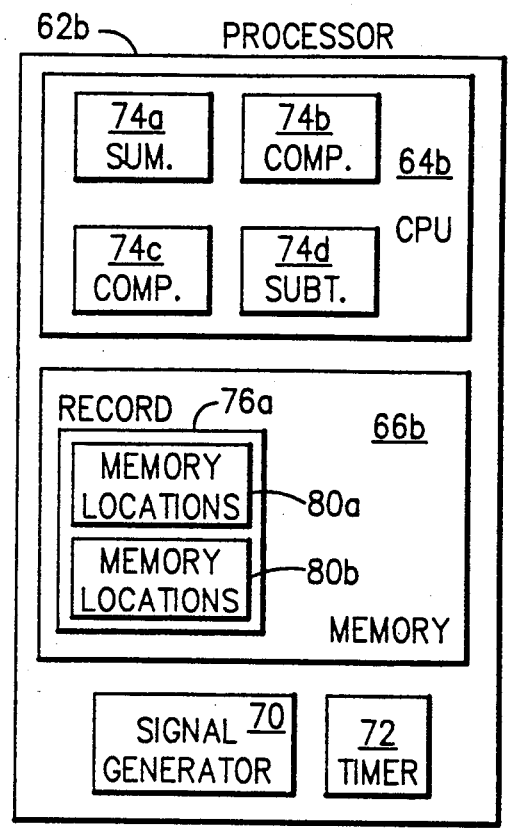
FIG. 3 shows a second embodiment of a processor that may be used in the radar system.

FIG. 3 shows a process 62b configured to differentiate, at least in part, between the two above-described types of electromagnetic radiation received by radar system 10 and to thereby produce adjusted summation values that provide what can be referred to as a second estimate of the relative amounts of interference received by the channels of system 10. This differentiation is based on the premise that for most of the applications of radar system 10, the electromagnetic radiation originally transmitted by system 10 and reflected back to it during a given scan of an area of interest is likely to produce no more than one relatively large electromagnetic radiation measurement in the channel over which the radiation was transmitted and, possibly, in several neighboring or adjacent channels. To prevent this one relatively large electromagnetic radiation value in each of these channels from affecting the selection of the channel to use to transmit the radar pulses during the next scan of the area of interest, adjusted electromagnetic radiation summation values can be derived by subtracting from the summation value for each channel, determined as discussed above, the maximum digital electromagnetic radiation value generated for the channel during the given scan of the area of interest.

Processor 62b of FIG. 3 is configured to do this; and, generally, central processing unit 64b of this processor includes summation means 74a, comparator 74b, a further comparator 74c and subtracting means 74d, and memory unit 66b includes recording means 76a. With the specific embodiment of processor 62b shown in FIG. 3, recording means 76a includes a multitude of first addressable memory locations, generally referenced as 80a, and a multitude of second addressable memory locations, generally referenced at 80b. With processor 62b, summation means 74a generally functions as discussed above in connection with processor 62a to derive an electromagnetic summation value for each of the channels of system 10. Also, recording means 76a maintains a record of the maximum digital electromagnetic radiation value generated for each channel during a given scan of the field of interest, and subtracting means 74d subtracts the maximum digital electromagnetic value generated for each channel during the given scan of the area of interest from the summation value for that channel to derive an adjusted summation value for each of the channels. After the given scan of the area of interest, comparator 74b determines the minimum adjusted electromagnetic interference summation value and the channel having that minimum value. Then generator 70 generates and transmits to selector 16, a signal identifying the channel having that minimum adjusted electromagnetic summation value.

Even more specifically, each of the first addressable memory locations 80a is associated with a respective one of the channels of the radar system, and processor 62b sets each first addressable memory location to a zero value prior to the given scan of the field of interest by the radar pulses. Summation means 74a adds to the value recorded at each first memory location, all of the digital electromagnetic radiation values generated for the channel associated with that memory location during the given scan of the field of interest by the radar pulses. In addition, each second addressable memory location 80b is also associated with a respective one of the channels, and processor 62b establishes a zero value at each of the second memory locations prior to the given scan of a field of interest by the radar pulses. Comparator 74c compares the value recorded at each of the second memory locations with each digital electromagnetic radiation value generated for the channel associated with the second memory location during the given scan of the field of interest, and replaces the former, recorded value with the latter, generated value if that generated value is greater than that recorded value.

Figure 4:
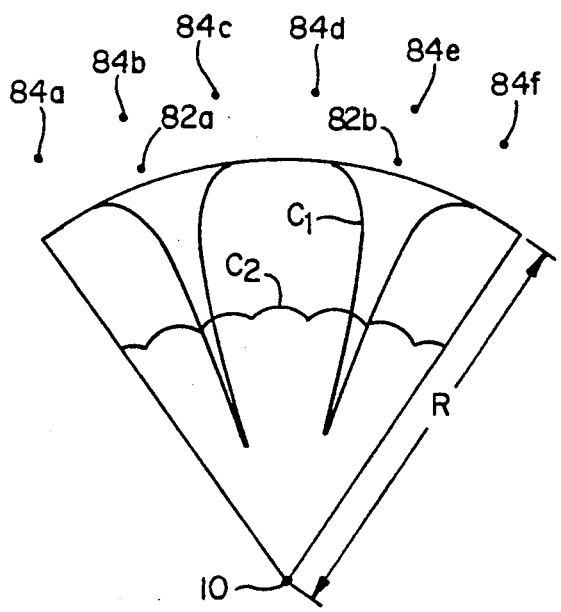
FIG. 4 illustrates how multiple interference sources may affect the ability of the radar system to detect a given target.

With the two procedures described above, the channel over which the radar pulses are transmitted, is selected on the basis of the total measured or estimated interference being received by the radar system over each of its different channels. When the interference is produced by multiple sources, the ability of the radar system to detect a target over a given channel depends, not only on the total amount of interference being received by the radar system over that channel, but also on where the interference sources are located. This may be understood with reference to FIG. 4, which shows a first set of two interference sources 82a and b, each of which may produce 30 decibels of interference in a given frequency channel, and a second set of six interference sources 84a–f, each of which may produce 10 decibels of interference in the given frequency channel. In the absence of any interference, radar system 10 can detect a given target at a range R. When interference is being produced solely by sources 82a and b, the radar system is able to detect the given target only when that target is radially inside curve $c_1$; and when interference is being produced solely by sources 84a–f, the radar system is able to detect the given target only when that target is radially inside curve $c_2$. For most applications, the latter detection ability would be preferred over the former detection ability, even though in both cases the total amount of electromagnetic interference, 60 decibels, is the same.

Figure 5:
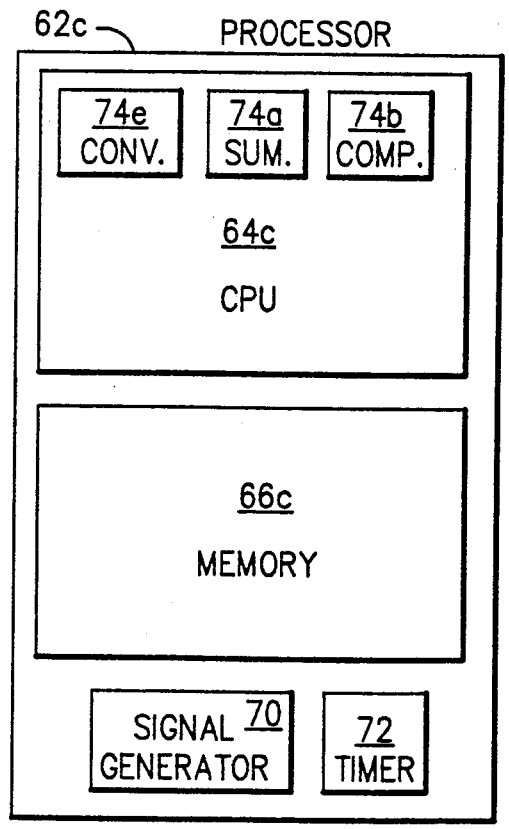
FIG. 5 depicts a third embodiment of a processor that may be used in the radar system of FIG. 1.

To account for the possibility that interference signals might be arriving at radar system 10 from multiple directions or sources, the selection of the channel to transmit the radar pulses may be made on the basis of values, referred to as detection potential values, that are derived from the measured electromagnetic radiation values and that represent, or indicate, the range at which the radar system may detect a given target over a given channel in the direction of arrival of a measured interference signal. FIG. 5 shows a processor 62c that is intended to do this.

Processor 62c, specifically central processing unit 64c thereof, includes conversion means 74e, summation means 74a and comparator 74b. Conversion means 74e receives from analog-to-digital converter 52, digital values of electromagnetic radiation measurements and converts those values to detection potential values. Summation means 74a adds all of the detection potential values generated during a given scan of the field of interest for each channel of the radar system, to thereby derive a composite detection potential value for each of those channels. After the given scan of the field of interest is completed, comparator 74b compares all of these composite detection potential values to determine the maximum of these values, and then signal generator 70 generates and transmits to channel selector 16 a signal identifying this channel having that maximum detection potential value.

Any suitable function may be used to determine the detection potential values from the electromagnetic radiation values transmitted to processor 62 from analog-to-digital converter 52; and, for instance, the former values may be determined by the equation:

$$d = 10^{-[x/(40A)]} \tag{1}$$

where, x is the digital values transmitted to processor 62 from converter 52,
d is the detection potential value, and
A is a normalizing factor whose units are bits/decibels, and serves to convert x to a decibel value.

Equation (1) produces a detection potential value which can be interpreted as a figure of merit for target detection in the direction of arrival of the interfering signal. The detection potential value is a fraction between 0 and 1 and is equal to the detection range of a given target in the presence of the interference signal divided by the detection range of that same target while no interference is present.

Processor 62c may be provided with a suitable program to determine the detection potential values from the input values transmitted to the processor from analog-to-digital converter 52. Preferably, though, processor 62c is provided with a look-up table having a detection potential value for each possible input value. With this arrangement, upon receipt of an input value from converter 52, the processor simply takes from this look-up table, the detection potential value for that input value.

As previously mentioned, during each set of electromagnetic radiation measurements, each channel of system 10 is measured, or sampled, for electromagnetic radiation at least once. In addition, preferably the channel over which the radar pulse is currently being transmitted, referred to as the transmitting channel, and a selected number of neighboring channels on either side of the transmitting channel are sampled at least twice. Further, this second, and any subsequent, sampling of the transmitting channel and the selected neighboring channels is taken near the end of a period between transmissions of successive radar pulses.

For instance, with a preferred system, 100 channels, numbered 00 to 99, are sampled over a period over which radar system 10 transmits three pulses, and the transmitting channel and the seven closest neighboring channels on either side of the transmitting channel are sampled an additional two times. Thus, if c represents the number of the transmitting channel, channels $c-7$ to $c+7$ are sampled a total of three times. The preferred sampling sequence is illustrated in FIG. 6. With reference to this Figure, after a first radar pulse is transmitted, channels 00–33 and $c-7$ to $c+2$ are sampled; after the second radar pulse is transmitted, channels 34–66, channels $c+3$ to $c+7$ and channels $c-7$ to $c-3$ are sampled; and after the third radar pulse is transmitted, channels 67–99 and channels $c-2$ to $c+7$ are sampled.

Moreover, for each channel that is sampled more than once during a given set of electromagnetic radiation measurements, only the smallest electromagnetic radiation measurement is used for subsequent processing by conversion means 74e. The other electromagnetic radiation measurements for the channel are not used on the assumption that the smallest electromagnetic radiation measurement is the most reliable measurement of the interference being received over the channel and the other measurements include reflected electromagnetic radiation that was originally transmitted by system 10 itself.

Figure 7:
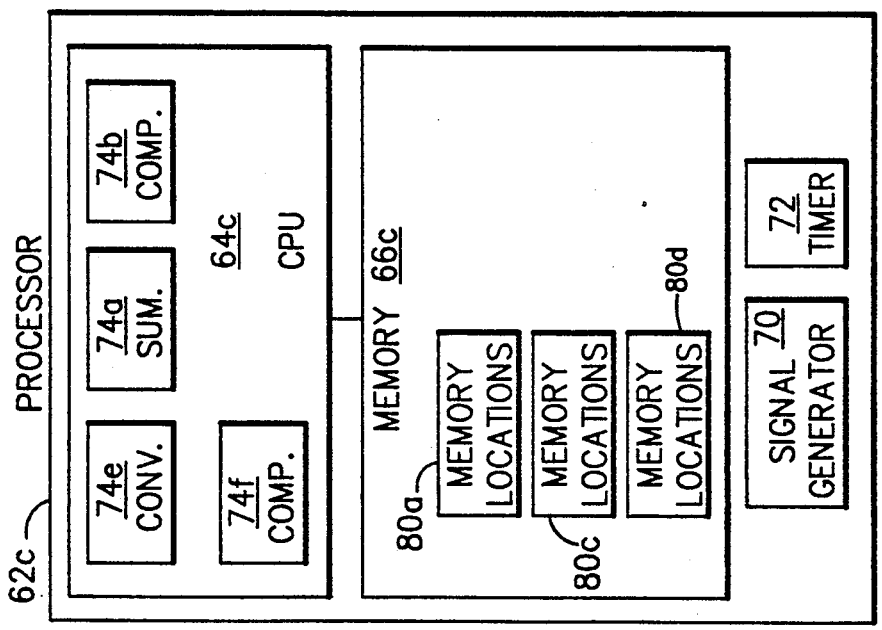
FIG. 7 shows a fourth embodiment of a processor that may be used in the radar system.

To accomplish the foregoing, with reference to FIG. 7, processor 62c, specifically central processing unit 64c thereof, may be provided with a second comparator 74f, and memory unit 66c may be provided with a multitude of first, second and third addressable memory locations, referenced at 80a, 80c and 80d respectively. Each of these first addressable memory locations 80a is associated with a respective one of the channels of radar system 10; and each of the second and third addressable memory locations 80c and 80d is associated with a respective one of the channels that is sampled three times for electromagnetic radiation during a given set of electromagnetic radiation measurements.

During a given set of electromagnetic radiation measurements, the first measurement for each channel is placed in the first addressable memory location associated with that channel; whenever a channel is sampled a second time, that sample measurement is placed in a second addressable memory location associated with the channel; and whenever a channel is sampled a third time, the third sample measurement is placed in third addressable memory location associated with the channel. After a given set of sample measurements is complete, comparator 74f is used to select the smallest electromagnetic radiation measurement for each channel sampled more than once.

More particularly, after the given set of sample measurements is completed, then for each channel sampled more than once, comparator 74f compares the values stored in the associated first memory location with the value stored in the associated second memory location, and replaces the former value with the latter value if that latter value is less than the former; and then comparator 74f compares the value stored in the associated first memory location with the value stored in the associated third memory location and replaces the former value with the latter value if that latter value is less than the former. After this is done, converter 74e may then process the values stored in the first memory locations to determine a detection potential value for each channel of system 10.

Figure 8:
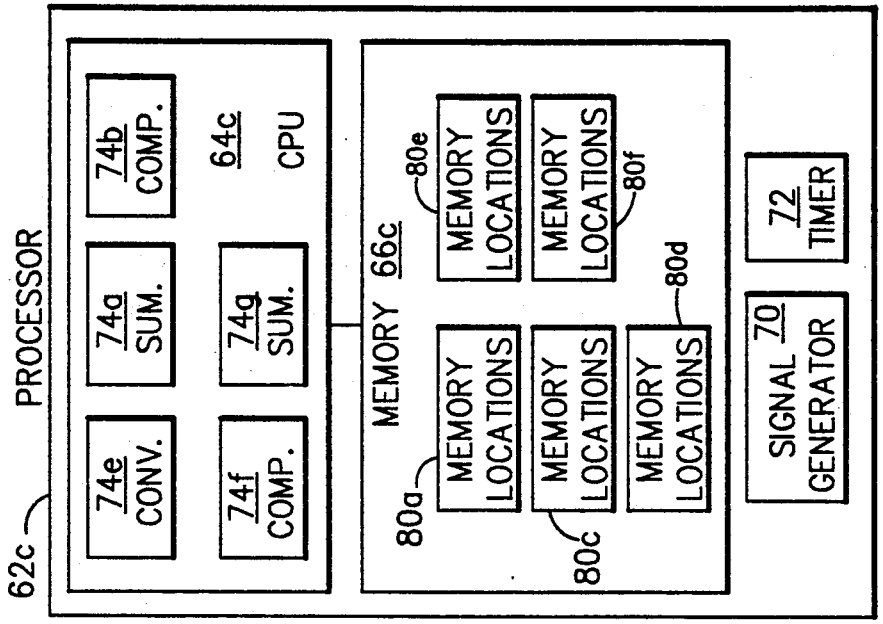
FIG. 8 illustrates a fifth embodiment of a control processor for the radar system.

Preferably, rather than waiting until the end of a given scan of the area of interest before summing all of the determined detection potential values for each channel, processor 62c maintains a current, partial composite detection potential value for each channel as the area of interest is being scanned by the radar pulses. To do this, with reference to FIG. 8, central processing unit 64c of processor 62c is provided with a second summing means 74g, and memory unit 66c of the processor is provided with fourth and fifth addressable memory locations, 80e and 80f respectively, with each of the fourth and each of the fifth addressable memory locations being associated with a respective one of the channels of radar system 10. Prior to a given scan of the area of interest by the radar system, processor 62 sets at least each fifth memory location to a zero value.

After each set of electromagnetic radiation measurements is completed during the given scan of the area of interest and the appropriate raw electromagnetic radiation values have been placed in the first memory locations 80a, conversion means 74e converts these raw electromagnetic radiation values for each channel to a detection potential value and places the converted value in the fourth memory location 80e associated with the channel, and then summing means 74g adds the value in each fourth memory location to the value stored in the fifth memory location associated with the same channel, producing a partial composite detection potential value for the associated channel. With this procedure, the value determined for each fifth memory location after the last set of electromagnetic radiation measurements has been taken during the given scan of the area of interest is the composite detection potential value for the channel associated with that fifth memory location.

With reference again to FIG. 1, with the embodiment of radar system 10 shown therein, filter means 50 is itself controlled by processor 62. More specifically, as previously discussed, the output signal of mixer 54 is amplitude modulated to the same degree as a chosen frequency band of the signal conducted to the mixer from the transmitter-receiver subsystem, with this chosen frequency band being determined by the frequency of the signal applied to the mixer by voltage controlled oscillator 56. Processor 62 generates a signal that is conducted to oscillator 56 to cause that oscillator to generate an output signal having a particular frequency that, in turn, determines the above-mentioned chosen frequency band. Preferably, this control signal from processor 62 is a digital signal, while oscillator 56 requires an analog input signal, and digital-to-analog converter 86 is used to convert the digital output signal from the processor to the necessary analog format required by the oscillator 56.

Commonly, the frequency of the output signal of a voltage controlled oscillator varies with temperature and other parameters; and because of this, oscillator 56 is regularly calibrated—that is, its output signal is checked and, if appropriate, adjusted to bring it to the proper frequency. To do this, sensing means 88 is provided to sense the frequency of the output signal from oscillator 56 and to generate a signal representing this frequency; and this generated signal is fed to processor 62, which may vary its own control signal conducted to oscillator 56 to bring the output signal thereof to the desired frequency value. For example, sensing means 88 may comprise a frequency counter which generates a digital output signal proportional to the number of times the voltage of the output signal from oscillator 56 rises above a threshold value.

In addition to the foregoing, conventional serial-to-parallel converters 90, 92 and 94 may be provided between processor 62 and various other data processing and data storage devices of system 10 to transform data between a serial format and a parallel format, which is the format in which processor 62 receives and generates data.

A radar pulse is highly directional—that is, each radar pulse is transmitted over a comparatively narrow arc—and antenna 36 is moved around in a circle to scan the radar pulses over a full 360 degrees, and for example, the antenna may make one complete revolution every 9.5 seconds. An observer may be interested in detecting targets or objects over that full 360 degrees; and when the present invention is employed under these circumstances, the above-discussed electromagnetic radiation measurements are preferably taken over one complete 360 degree scan of the area of interest, starting and finishing at a selected azimuth of relatively low interest. The appropriate calculations are done after this complete scan and, if appropriate, the radar pulse is switched from one channel to another at the low interest azimuth.

Often an observer is only interested in detecting targets or objects in a small portion or segment of the full 360 degree field that may be scanned by the radar pulse. For instance, with reference to FIG. 9, an observer may be interested only in detecting ships or planes in or entering area A, which is bounded by azimuths AZ1 and AZ2 relative to the radar system. Under these circumstances, it is desirable to select the frequency channel over which the radar pulse is transmitted, at least while that pulse is being scanned across area A, on the basis of electromagnetic interference measurements taken while the radar pulse is scanned across that same area.

For this reason, radar system 10 is preferably provided with azimuth identifying means to generate a signal identifying the azimuth of the radar pulse. This azimuth identifying function may be done by general purpose computer 48, or a separate processing device may be provided for this purpose. This signal is conducted to subsystem 14, and this subsystem determines whether the current azimuth of the radar pulse is between the azimuths bounding the area of interest. If it is, subsystem 14 is actuated to measure the electromagnetic radiation being received by the transmitter-receiver subsystem, as described above. If, however, the current azimuth of the radar beam is outside the area bounded by azimuths AZ1 and AZ2, then preferably subsystem 14 is in a deactuated state and is not used to measure the electromagnetic radiation being received by the transmitter-receiver subsystem.

The signal identifying the azimuth of the radar pulse may be generated in any suitable manner. For instance, it may be produced by a signal generator controlled by a sensor or sensors (not shown) that physically sense, either directly or indirectly, the position of antenna 36, or by a clock or timer (not shown) synchronized with the movement of the antenna so that, for example, the magnitude of the signal from this signal generator is proportional to the current azimuth of the radar beam, for example as measured from true north.

Likewise, the signal identifying the azimuth of the radar pulse may be employed or processed by subsystem 14 in any suitable manner to switch this subsystem between the above-described actuated and deactuated states. For example, this signal may be employed to actuate or deactuate one or more switches, either electromechanical or solid state, in the line conducting to subsystem 14 the output signal from subsystem 12 so that the analog output signal from transmitter-receiver subsystem 12 is conducted to filter means 50 only when the radar pulse is being transmitted over area A.

Alternatively, and preferably, the signal identifying the azimuth of the radar pulse is conducted to processor 62, and this processor includes a comparator (not shown) to determine whether the current azimuth of the radar pulse is between the azimuths bounding the area of interest. If it is, processor 62 generates a signal that is conducted to the filter means 50, which in turn is actuated to generate an output signal as described in detail above. With this preferred arrangement, if the current azimuth of the radar pulse is outside the azimuths bounding the area of interest, filter means 50 is in a deactuated state and it does not pass any signals to the analog-to-digital converter 52.

With reference to FIG. 10, the present invention may be used to take electromagnetic radiation measurements, and to select the channel over which to transmit the radar pulses, over multiple areas of interest, such as areas A1 and A2. To do this, separate electromagnetic radiation measurements are taken over each of the areas of interest to derive a set of electromagnetic radiation measurement data for each area. After each scan of an area of interest, respective electromagnetic summation and adjusted electromagnetic summation values or composite detection potential values are calculated for that area, and processor 62 selects the frequency channel over which the radar pulse is to be transmitted the next time the radar pulse is scanned across that area. When the present invention is employed to select the channel over which to transmit the radar pulse, over each of multiple areas of interest, these areas should not overlap since the radar pulses cannot be simultaneously transmitted over multiple frequencies.

Figure 11:
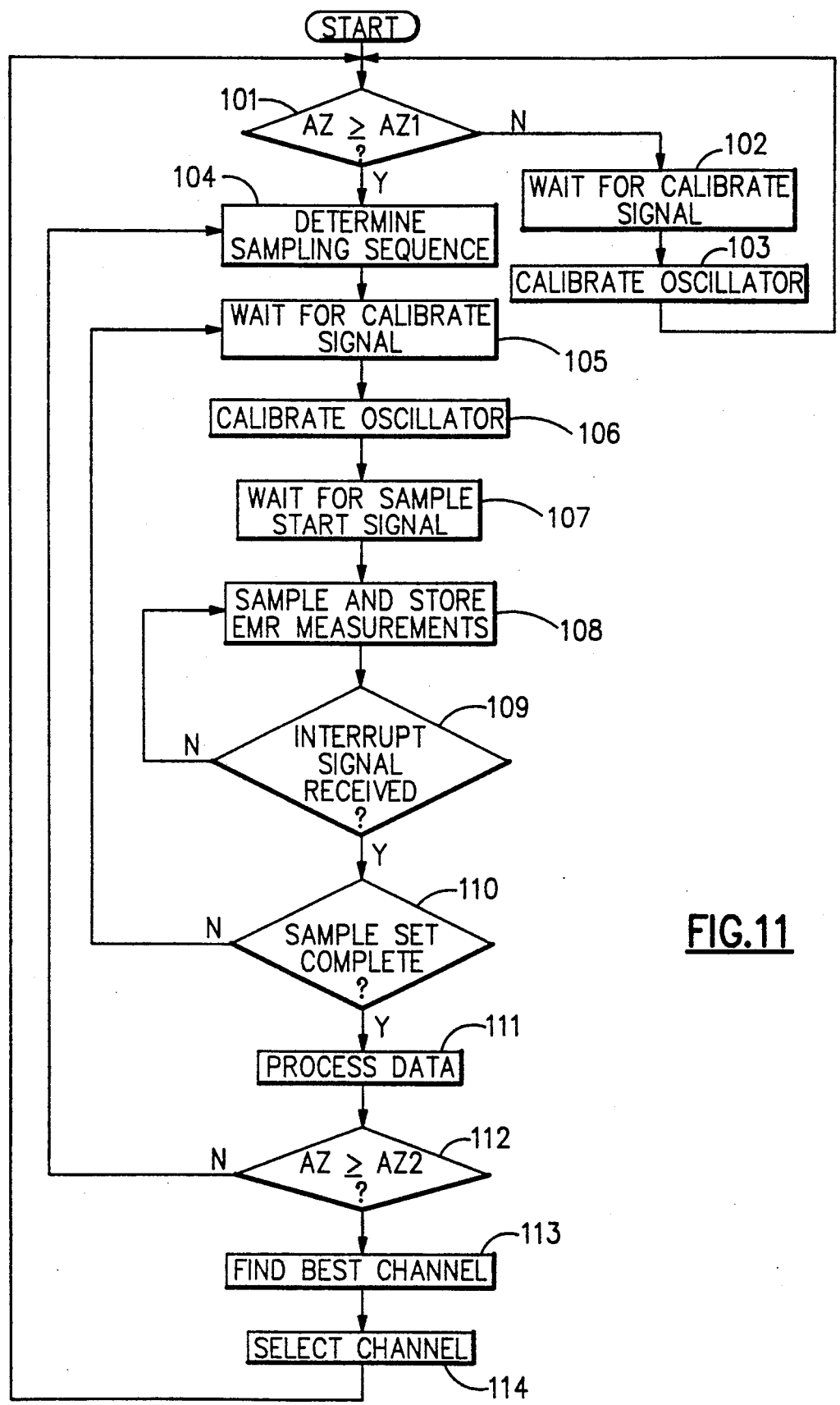
FIG. 11 is a flow chart outlining one procedure for operating the radar system.

FIG. 11 is a flow chart outlining a preferred method for operating system 10. At step 101, the current azimuth of antenna 36 is determined and compared to azimuth AZ1 of the starting edge of the area of interest. This latter azimuth value may have been provided by operator, or processor 62 itself may provide values for AZ1. If the current antenna azimuth is less than AZ1, the method proceeds to steps 102 and 103. At step 102, processor 62 waits for a first predetermined length of time after the next radar pulse is transmitted by radar system 10; and after this length of time, timer 72 of the processor generates an interrupt signal instructing the processor to continue. At step 103, the processor calibrates variable controlled oscillator 56 in the manner described above. Upon completion of this calibration, the processor waits for a second predetermined length of time, the end of which is signaled by a further interrupt signal from timer 72, and then the processor returns to step 101, where the current antenna azimuth is again compared to AZ1.

Steps 101, 102 and 103 are repeated until the antenna azimuth becomes greater than AZ1; and when this happens, processor 62 skips to step 104 to begin a sequence of steps referred to as the "in zone processing sequence." At step 104, the processor determines the sequence in which the frequency channels of system 10 are to be sampled for electromagnetic radiation, and determines the control values that must be transmitted to digital-to-analog converter 64 in order to control oscillator 56 during the next set of electromagnetic radiation measurements. Any suitable rule may be used to determine the order in which the frequency channels of system 10 are sampled; and, for instance, the channels may be sampled in the order discussed above in connection with FIG. 6. Likewise, any appropriate procedure may be used to determine the control values that must be transmitted to converter 86 to control oscillator 56 to sample the channels of system 10 in the desired manner. For example, these control values may be located in a look-up table, with each control value being addressed by a respective one channel number.

After step 104 is completed, the processor proceeds to steps 105 and 106, which are identical to steps 102 and 103, respectively. At step 105, the processor waits for the first predetermined length of time after the next radar pulse is transmitted by system 10; and then, after receiving the appropriate interrupt signal from timer 72, at step 106, the processor calibrates oscillator 56. When the oscillator calibration is completed, the processor waits for the second predetermined length of time, the end of which is indicated by an interrupt signal from timer 72. This interrupt signal directs the processor to begin to measure the electromagnetic radiation being received over the channels of system 10 and to store the measured values, as represented by steps 107 and 108, respectively, of the flow chart shown in FIG. 11. This is done by transmitting the appropriate control values to digital-to-analog converter 86 in the sequence determined in step 104.

Processor 62 continues to collect electromagnetic radiation amplitude measurements in the sequence until the end of a third predetermined length of time, when the central processing unit 64 receives an interrupt signal from timer 72, represented by step 109 of the flow chart. This interrupt signal, in effect, alerts the processor to pause in its sampling sequence until after the transmission of the next radar pulse. During this pause, the processor moves onto step 110, which is to determine if the current set of electromagnetic measurements is complete. If this set is not complete, the processor returns to step 104 and steps 104-110 are repeated until the current set of electromagnetic radiation measurements is completed.

Once this set of measurements is complete, the processor moves on to step 111. At this step, for each channel that was sampled more than once, the processor determines the lowest electromagnetic radiation measurement, the electromagnetic radiation measurements are converted to the above-discussed detection potential values, and the determined detection potential value for each channel is added to the then current partial composite detection value for the channel. Once step 111 is completed, the processor moves on to step 112.

At step 112, the current antenna azimuth is again determined and this time compared to the azimuth, AZ2, of the trailing edge of the area of interest. If that current antenna azimuth is less than AZ2, the processor repeats steps 104-112, and makes another set of electromagnetic measurements. If, though, at step 112, the antenna azimuth is greater than AZ2, the processor proceeds to step 113. At this step, the processor compares the current composite detection values for all of the channels of system 10, and determines the channel having the largest of these values. Then, at step 114, the processor generates and transmits to channel selector 16, a signal identifying the channel having that largest detection potential value; and after this, the processor returns to step 101.

The system of the present invention may be employed on a moving carrier, such as an airplane or a ship; and in this case, the start and end azimuths bounding the area of interest may change over time relative to the radar system, even if the area of interest does not change. For example, with reference to FIG. 12, when radar system 10 is at point a, the start azimuth is AZ1a, while when the carrier is at point b, the start azimuth is AZ1b. Conventional position detecting systems may be employed to determine the current position of the carrier of the radar system at any given point in time relative to the ground or another fixed object, and this data may be used to calculate the start and end azimuths bounding an area of interest.

For example, FIG. 13 shows the area of interest A and the path of the radar system on an x-y coordinate system. Area A is a square defined by the points $(x_1, y_1)$ and $(x_2, y_2)$, and point a has the coordinates $(x_a, y_a)$. When the radar system is at point a, the start azimuth is given by the angle $\theta$, which is the angle between true north (represented in FIG. 13 by the y-axis) and the line through points $(x_a, y_a)$ and $(x_1, y_1)$. $\theta$ is also the angle between the line $x = x_a$ and the line through points $(x_a, y_a)$ and $(x_1, y_1)$, and this $\theta$ can be determined from the equation:

$$\sin \theta = \frac{x}{r}$$

x and r can be expressed as follows:

$$x = x_1 - X_a$$
$$r = \sqrt{(x_1 - x_a)^2 + (y_1 - y_a)^2}$$

so that $\theta$ can be determined from the equation:

$$\sin \theta = \frac{x_1 - x_a}{\sqrt{(x_1 - x_a)^2 + (y_1 - y_a)^2}}$$

The end azimuth bounding the area of interest can be determined in an analogous manner. This calculation may be done by general purpose computer 48, by processor 62, or by a separate processor provided for this specific purpose. Also, under certain circumstances, the start and end azimuths bounding an area of interest may be calculated by hand, without the assistance of any electronic data processing equipment.

All the elements in the block diagram of FIG. 1 can be either manufactured or purchased as separate commercial entities and incorporated into the embodiments of this invention by those skilled in the art. Also, while radar system 10 has been shown with a single transmitting-receiving antenna, separate transmit and receive antennas may be used instead, as would be easily understood by those skilled in the art.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A radar system, comprising:
   a transmitter-receiver subsystem to generate and to transmit a series of electromagnetic pulses, to scan the pulses across an area of interest a multitude of times, and to receive echoes of the pulses, the transmitter-receiver subsystem including means to transmit the radar pulses at a multitude or frequencies, each of said frequencies being in one of a multitude of channels; and
   a least jammed frequency channel selection subsystem to measure electromagnetic interference received by the transmitter-receiver subsystem in each of the channels, during each of at least selected scans of the pulses across the area of interest, and including
   (i) means to generate a digital signal representing the amplitude of the electromagnetic interference received by the transmitter-receiver subsystem in a given one of said channels, and (ii) control means connected to the digital signal generating means to select each of the channels of the radar system as the given channel a multitude of times during each of said selected scans of the area of interest, a multitude of said digital signals are generated for each channel of the radar system, the control means including a processor to receive said digital signals, to add together the digital values generated during a given scan of the area of interest for each channel of the radar system to derive a respective electromagnetic interference summation value for each of the channels, to determine, using the electromagnetic interference summation values, the one channel receiving the least amount of interference during each of said selected scans of the radar pulses across the area of interest, and to generate a channel signal identifying said one channel;

the transmitter-receiver subsystem including a channel selector for receiving said channel signal from the least jammed frequency selection subsystem, and in response to said channel signal, for selecting a frequency in said one channel to transmit the pulses the next time the pulses are scanned across the area of interest.

2. A radar system according to claim 1, wherein:

the transmitter-receiver subsystem generates an output signal including a multitude of component signals at a multitude of frequencies, the magnitude of each of the component signals being proportional to the amplitude of the electromagnetic interference received by the transmitter-receiver subsystem at the frequency of the component signal;

the means to generate the digital signals includes (i) filter means connected to the transmitter-receiver subsystem to receive the output signal thereof and to generate a filtered output signal representing the amplitude of the electromagnetic interference received by the transmitter-receiver subsystem in a given one of said channels, and (ii) an analog-to-digital converter connected to the filter means to receive the filtered output signal therefrom and to generate the digital signal representing the amplitude of the electromagnetic interference received by the transmitter-receiver subsystem in said given channel; and (iii) the control means is connected to the filter means to select said given channel, and is connected to the analog-to-digital converter to receive the digital signal therefrom.

3. A radar system according to claim 2, wherein:

the processor includes summation means to add the digital values generated during the given scan of the area of interest for each channel of the radar system to derive the electromagnetic interference summation value for each of said channels.

4. A radar system according to claim 3, wherein the summation means includes:

a memory section having a multitude of addressable memory locations, each of the addressable memory locations being associated with a respective one of the channels;

means to set each addressable memory location to a zero value prior to the selected scans of the field of interest by the radar pulses; and means to add to the value recorded at each memory location, each digital value generated for the channel associated with the memory location during the given scan of the area of interest by the radar pulses.

5. A radar system according to claim 3, wherein the processor further includes:

means to determine the minimum electromagnetic interference summation value derived during said given scan of the area of interest; and means to generate a signal identifying the channel having said minimum electromagnetic interference summation value.

6. A radar system according to claim 3, wherein the processor further includes:

means to maintain a record of the maximum digital value generated for each channel during the given scan of the area of interest;

means to subtract the maximum digital value generated for each channel during the given scan of the area of interest from the electromagnetic interference summation value for the channel to derive an adjusted summation value for each of the channels;

means to determine the minimum adjusted summation value derived during the given scan of the area of interest; and means to generate a signal identifying the channel having said minimum adjusted summation value.

7. A radar system according to claim 6, wherein:

the summation means includes (i) a first memory section having a first set of addressable memory locations, each one of the first set of addressable memory locations being associated with a respective one of the channels, (ii) means to set each of the first set of addressable memory locations to a zero value prior to the given scan of the area of interest by the radar pulses, and (iii) means to add to the value recorded at each of the first set of addressable memory locations, each digital value generated for the channel associated with the memory address during the given scan of the area of interest by the radar pulses; and the means to maintain the record of the maximum digital value includes (i) a second memory section having a second set of addressable memory locations, each one of the second set of addressable memory locations being associated with a respective one of the channels, (ii) means to establish a zero value at each of the second set of addressable memory locations prior to the given scan of the area of interest by the radar pulses, and (iii) means to compare the value recorded at each of the second set of addressable memory locations with each digital value generated for the channel associated with the memory location during the given scan of the area of interest, and to replace said recorded value with said generated value if said generated value is greater than said recorded value.

8. A radar system according to claim 2, wherein the control means includes means to identify the current given channel during said selected scans of the radar pulses across the area of interest.

9. A radar system according to claim 1, wherein:

the radar system further includes means to generate an azimuth signal identifying the azimuth of the radar pulses and to conduct the an azimuth signal to the least jammed frequency selection subsystem;

the area of interest is bounded by start and end azimuths;

the least jammed frequency selection subsystem includes means to determine when the azimuth of the radar pulse is between the start and end azimuths; and the least jammed frequency selection subsystem has a deactuated state and an actuated state wherein the least jammed frequency selection subsystem measures the electromagnetic interference received by the transmitter-receiver subsystem, the least jammed frequency selection subsystem being in the deactuated state when the azimuth of the radar pulse is outside the start and end azimuths, and being in the actuated state when the azimuth of the radar pulse is between the start and end azimuths.

10. A method for operating a radar system of the type wherein the system generates a series of electromagnetic pulses and receives echoes of the pulses to detect the presence of objects, the electromagnetic pulses are transmitted over a multitude of channels, each channel consisting of a selected frequency range, and the pulses are repeatedly scanned across an area of interest, the method comprising the steps of:

measuring electromagnetic interference received by the radar system over each of said channels during at least selected scans of the pulses across the area of interest, the measuring step including the steps of, for each of the selected scans of the pulses across the area of interest (i) measuring the electromagnetic interference received by the radar system over each channel a multitude of times, (ii) converting each measured electromagnetic interference value to a corresponding digital value, and (iii) for each channel, adding all of the digital values obtained for the channel to derive a total interference value; and selecting the channel having the least electromagnetic interference to transmit the radar pulses the next time the pulses are scanned across the area of interest.

11. A method according to claim 10, wherein the selecting step includes the step of selecting the channel having the lowest total interference value.

12. A method according to claim 10, wherein:
the measuring step further includes the steps of for each of the selected scans of the pulses across the area of interest, (iv) maintaining a record of the largest single digital electromagnetic interference value for each channel, and (v) for each channel, after the total interference value has been derived, subtracting from said total interference value, the value of the largest single digital electromagnetic interference value for the channel to derive an adjusted total interference value for the channel; and the selecting step includes the step of selecting the channel having the lowest adjusted total interference value.

13. A method according to claim 12, wherein the maintaining step includes the steps of:
for each channel,
recording at a first associated memory address, the first digital electromagnetic interference value obtained for the channel during the given scan, and for each digital electromagnetic interference value subsequently obtained for the channel during the given scan, comparing the value of the subsequently obtained digital electromagnetic interference value to the value recorded at the first memory address associated with the channel, and if the value of the subsequently obtained digital value is greater than the value recorded at said first associated memory address, replacing the value recorded at said first associated memory address with the value of said subsequently obtained digital value.

14. A method according to claim 13, wherein the adding step includes the steps of, for each channel, recording the first digital electromagnetic value obtained for the channel at a second memory address; and for each subsequently obtained digital electromagnetic interference value obtained for the channel, replacing the value at the second memory address with the sum of the subsequently obtained digital electromagnetic interference value and the value at the second memory address.

15. A radar system comprising:
a transmitter/receiver subsystem to generate and to transmit a series of electromagnetic pulses, to scan the pulses across an area of interest a multitude of time, and to receive echoes of the pulses, the transmitter/receiver subsystem including means to transmit the pulses at a multitude of frequencies, each of the frequencies being in one of a multitude of channels; and a frequence channel selection subsystem to measure the electromagnetic radiation received by the transmitter/receiver subsystem in each of the channels during each of at least selected scans of the pulses across the area of interest, to convert the measured electromagnetic radiation value for each channel to a composite detection potential value to represent a potential to detect a given target in the area of interest by transmitting the radar pulses over the channel, to determine the one channel having the maximum composite detection potential value, and to generate a signal identifying said one channel;

the transmitter/receiver subsystem including a channel selector for receiving said signal from the frequency channel selection subsystem, and in response to said signal, for selecting a frequency in said one channel to transmit the pulses the next time the pulses are scanned across the area of interest;

the frequency channel selection subsystem including:
(i) means to measure the electromagnetic radiation received by the transmitter/receiver subsystem in each of the channels at each of a multitude of directions across the area of interest and during a given scan thereof, (ii) means to convert the measured electromagnetic radiation values to partial detection potential value, and (iii) means to sum all of the partial detection potential values determined for each channel during the given scan of the area of interest to determine the composite detection potential value for the channel.

16. A radar system according to claim 15, wherein:
the transmitter/receiver subsystem generates an output signal including a multitude of component signals at a multitude of frequencies, the magnitude of each of the component signals being proportional to the amplitude of the electromagnetic radiation received by the transmitter/receiver subsystem at the frequency of the component signal;

the means to measure the electromagnetic radiation includes (i) filter means connected to the transmitter/receiver subsystem to receive the output signal therefrom and to generate a filtered output signal representing the amplitude of electromagnetic radiation received by the transmitter/receiver subsystem in a given one of said channels, and (ii) an analog-to-digital converter connected to the filter means to receive the filtered output signal therefrom and to generate a digital signal representing the amplitude of the electromagnetic radiation received by the transmitter/receiver subsystem in said given one channel; and the means to convert the measured electromagnetic radiation values includes a processor connected to the analog-to-digital converter to receive said digital signals therefrom, and to convert said digital signals to corresponding detection potential values.

17. A radar system according to claim 16, wherein the processor is further connected to the filter means to select said given channel, and the processor selects each of the channels as the given channel at least once during each of the selected scans of the area of interest.

18. A method for operating a radar system of the type wherein the system generates a series of electromagnetic pulses and receives echoes of the pulses to detect the presence of objects, the electromagnetic pulses are transmitted over a multitude of channels, each channel consisting of a selected frequency range, and the pulses are repeatedly scanned across an area of interest, the method comprising the steps of:

measuring electromagnetic radiation received by the radar system over each of said channels during at least selected scans of the pulses across the area of interest, the measuring step including the steps of, for each of the selected scans of the pulses of the across the area of interest (i) measuring the electromagnetic radiation received by the radar system over each channel at a multitude of directions across the area of interest, (ii) converting each measured electromagnetic radiation value to a corresponding digital value, (iii) converting each of at least selected digital values to a corresponding detection potential value in a predetermined manner to represent the potential of the radar system to detect a given target in the area of interest by transmitting the radar pulses over a given one of the channels, (iv) for each channel, adding all of the detection potential values obtained for the channel to derive a composite detection potential value; and selecting the channel having the largest detection potential value to transmit the radar pulses the next time the pulses are scanned across the area of interest.

19. A method according to claim 18, wherein:

each of the selected scans includes a multitude of periods;

for each of the selected scans of the pulses across the area of the interest, the step of measuring the electromagnetic radiation received by the radar system over each channel at a multitude of directions includes the steps of, (i) measuring the electromagnetic radiation received by the radar system over each channel at least once during each period of the selected scan, and measuring the electromagnetic radiation received by the radar system over selected channels a plurality of times during each period of the selected scans.

20. A method according claim 19, wherein:

each channel has a respective one frequency band;

the channels form an order according to the frequencies of the bands thereof;

during each of the selected scans, the radar pulses are transmitted over a transmitting channel; and said selected channels includes the transmitting channel and a multitude of adjacent channels on either side thereof in said order of channels.

* * * * *

UNITED STATES PATENT AND TRADEMARK OFFICE
CERTIFICATE OF CORRECTION

PATENT NO. : 5,017,921

DATED : May 21, 1991

INVENTOR(S) : John McGill

It is certified that error appears in the above-identified patent and that said Letters Patent is hereby corrected as shown below:

Col. 16, line 56, "or" should read --of--.

Col. 17, line 5 and 6, (claim 1) "interest, a multitude of said digital signals are generated for each channel of the radar system" should read as --interest so that during each of said selected scans of the area of interest, a multitude of said digited signals are generated for each channel of the radar system--.

Signed and Sealed this

Nineteenth Day of January, 1993

Attest:

DOUGLAS B. COMER

*Attesting Officer*   Acting Commissioner of Patents and Trademarks